Feb. 8, 1927.
R. J. MILLIGAN
1,616,981
TUBE SPLICING MANDREL
Filed Sept. 17, 1925
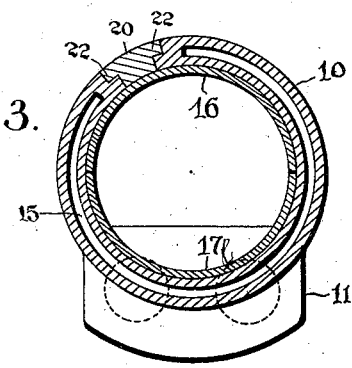
Fig. 3.
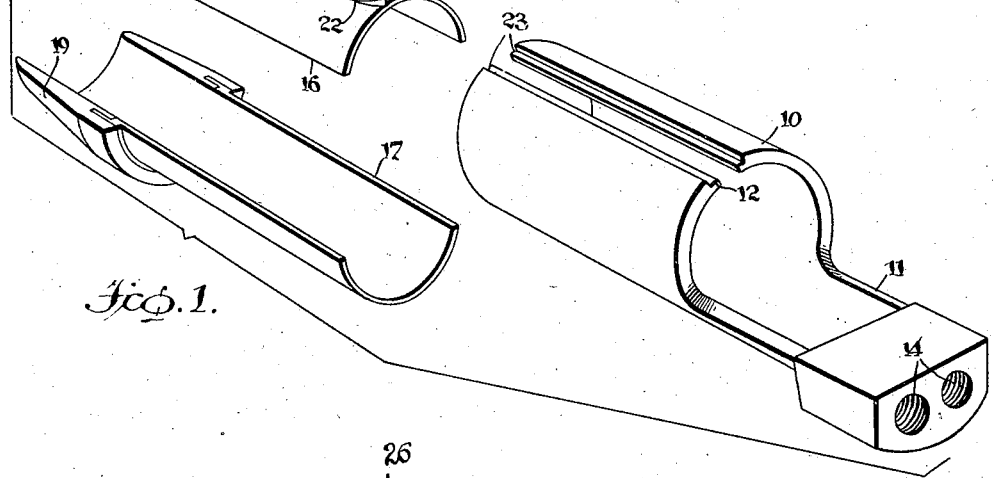
Fig. 1.
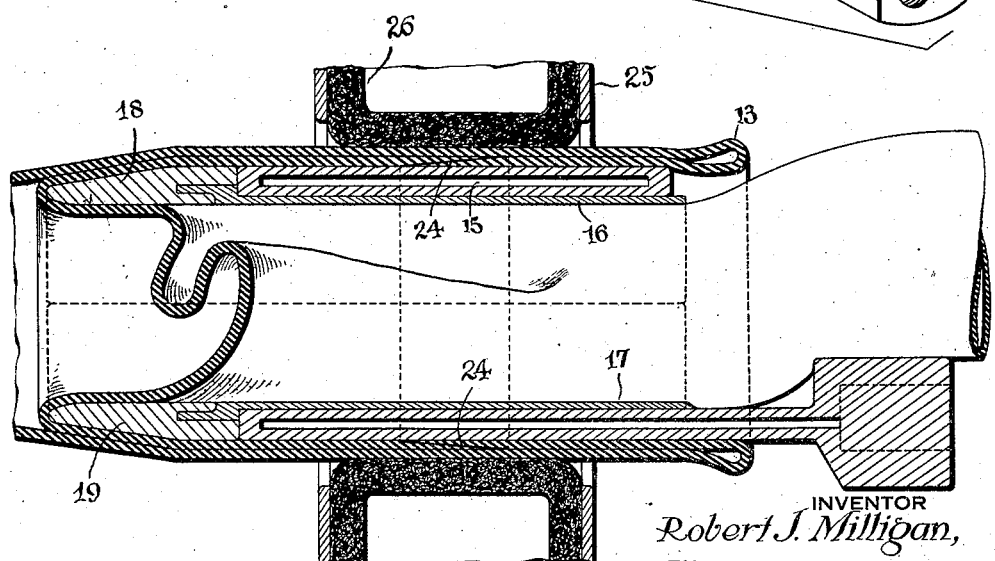
INVENTOR
Robert J. Milligan,
BY
ATTORNEY Patented Feb. 8, 1927.

1,616,981

UNITED STATES PATENT OFFICE.

ROBERT J. MILLIGAN, OF AKRON, OHIO, ASSIGNOR TO THE GOODYEAR TIRE & RUBBER COMPANY, OF AKRON, OHIO, A CORPORATION OF OHIO.

TUBE-SPLICING MANDREL.

Application filed September 17, 1925. Serial No. 56,952.

My invention relates to rubber tube splicing devices and it has particular relation to mandrels adapted to be employed in effecting unions between the ends of inner tubes for use in pneumatic tire casings in the course of forming them into annular shapes.

One object of my invention is to provide a tube splicing device which is composed of a minimum number of elements and which requires a minimum number of manual operations for splicing the ends of inner tubes.

Another object of my invention is to provide a heat-insulating means for a tube splicing mandrel which serves an additional purpose of supplementing the surface of the mandrel upon which the tube is spliced.

In the manufacture of inner tubes for pneumatic tires, layers of rubber stock are applied to a straight cylindrical mandrel of proper length and the mandrel with its sheath of rubber thereon is subsequently placed within a heater to vulcanize the tubes. After the vulcanizing process is completed, the rubber sheath, in the form of a tube is stripped from the mandrel and, in order to shape it into annular form, the ends thereof must be spliced together. This operation is accomplished by applying suitable cement or other vulcanizable material to the ends of the tube, which have been properly skived in preparation therefor, slightly telescoping one end within the other, and subjecting them to heat to vulcanize the cement, thereby causing a firm union between the ends of the tube.

Because of the fact that great numbers of inner tubes are manufactured, it is evident that any saving in the time required to splice the ends effects a material saving in manufacturing costs.

A well known device which has been employed in splicing tubes consists in a cylindrical mandrel having a steam or other fluid heating chamber and formed with a longitudinal slot therein, through which a tube having its ends secured together by means of uncured cement may be inserted. Heat-insulating members are provided which engage the inner walls of the cylindrical mandrel to protect the portion of the tube on the inside of the mandrel from the heating chamber.

After the tube is inserted through the slot in the mandrel, a gate member pivoted upon the mandrel is adapted to be manually moved to close the slot in order to form a complete cylinder. The portion of the tube which has been spliced together is then drawn over the circular mandrel and a segmental heating annulus provided with a pneumatic heating pad is secured about the mandrel in circumferential relation over the joined ends of the tube. These cemented ends are then vulcanized together by the heat from the chamber of the mandrel and from the segmental heating annulus.

It is the principal aim of my invention to dispense with the hinged gate member and to provide a novel closing device for a slot formed in a mandrel similar to the mandrel previously described. With this end in view, I have provided a heat-insulating apparatus composed of two complemental cylindrical members which fit into the mandrel, one of which members is formed with a key of equal width with the slot in the mandrel adapted to be inserted into the slot to close it. The outer portion of the key member is disposed flush with the outer surface of the mandrel. By utilization of a member of this nature, the number of operations involved in properly positioning the cemented ends of the tube upon the mandrel is reduced. Also the number of parts required for the splicing device is reduced and the manufacture thereof materially simplified. This reduction of time required to splice the ends of the tube and the simplification of the structural elements of the device are particularly important advantages in factories where thousands of tubes are spliced daily.

For a better understanding of my invention, reference may now be had to the accompanying drawings forming a part of this specification, of which;

Fig. 1 is an exploded perspective view of a splicing device embodying my invention;

Fig. 2 is a longitudinal cross-sectional view of my tube splicing device illustrating the relationship between the elements thereof and an inner tube which is to be spliced thereon; and Fig. 3 is a cross-sectional view of the assembled device, the plane of the section being taken substantially centrally thereof.

In practicing my invention I provide a cylindrical hollow metal mandrel 10 which is formed with a relatively small hollow extension 11. At the side of the mandrel, substantially opposite that from which the extension projects, a longitudinal slot 12 is formed which permits an inner tube 13 to be inserted within the mandrel. The extension 11 formed on the mandrel is provided with threaded openings 14 which are adapted to communicate with a source of heating fluid, such as steam or hot water, which is circulated within a heating chamber 15 provided in the cylindrical mandrel.

In order to prevent the inner tube from directly engaging the inner walls of the heating chamber 15, two semi-cylindrical insulating members 16 and 17 are provided which are adapted to be inserted within the mandrel 10 and are formed with tapering end portions 18 and 19, respectively. Each of the end portions 18 and 19 serves as an abutment for properly positioning the members 16 and 17 within the mandrel. The outer surfaces of these tapering end portions form substantially a continuation of the outer cylindrical surface of the mandrel. The member 16 is provided with a longitudinally extending key member 20 which fits snugly within the slot 12 and completes the cylindrical surface of the mandrel 10 at the location of the slot 12. The key member 20 may be cast integrally with the member 16 or it may be separately formed and secured in proper position by any suitable fastening means. It will be observed that the end of the key member is provided with a tapered or reduced portion 21 which serves to facilitate the insertion of the member 16 within the mandrel. Also the outer portion of the key member 20 is slightly enlarged, as indicated at 22 and the slot 12 is correspondingly enlarged at 23 in order to prevent movement of the member 16 toward the axis of the mandrel and to maintain the outer surface of the key member flush with the outer surface of the mandrel. The other heat-insulating member 17 is disposed concentrically with respect to the inner wall of the heating chamber 15 and in contact therewith. It is necessary that the member 17 be permanently secured in proper position within the mandrel by means of suitable connecting device or by welding, in order to prevent it from being displaced when removing an inner tube from the mandrel, and to serve as a guide for the member 16.

In the operation of the device embodying my invention, after the member 17 is secured in proper position within the cylindrical mandrel and an inner tube 13, which has its ends slightly telescoped, as indicated at 24, and coated with cement preparatory to vulcanization, is inserted through the slot 12, the joined ends 24 being spaced from the mandrel. At this point in the operation, the member 16 is inserted in the mandrel, the key 20 closing the slot 12. The inner tube is then drawn telescopically over the outer surface of the mandrel until the joined ends 24 are in contact with the outer surface of the mandrel approximately centrally thereof. Pressure is applied to the tube against the mandrel by means of an annular member 25 having a pneumatic pad 26 disposed therein. The heating chamber 15 vulcanizes the cement at the ends of the tube, after which vulcanization the members 25 and 16 are removed and the tube 13 replaced by another to be spliced.

It will be apparent from the foregoing description that my invention provides a decided improvement over the devices formerly employed in splicing tubes and that, by the utilization of my invention, speed of production may be increased while the reduction of the number of parts required in constructing the device affords a corresponding expense reduction in the manufacturing cost thereof.

Although I have illustrated but one form which my invention may assume and have described in detail but a single application thereof, it will be apparent to those skilled in the art that it is not so limited but that various minor modifications and changes may be made therein without departing from the spirit of my invention or from the scope of the appended claims.

What I claim is:

1. A tube splicing device comprising an annular mandrel having a slot therein and a heat insulating member adapted to be inserted within the mandrel, said member being provided with means secured thereto for closing the slot.

2. A tube splicing device comprising an annular mandrel provided with a slot, a semi-cylindrical member adapted to be inserted in the mandrel, and a key member formed on the member adapted to be disposed in the slot.

3. A tube splicing device comprising an annular mandrel provided with a slotted portion and with a heating chamber therein, and heat insulating means including two semi-cylindrical members adapted to be inserted within the mandrel, one of the members being formed with means for closing the slotted portion of the mandrel flush with the exterior surface thereof.

4. A heat insulating member adapted to be inserted in a tube splicing device comprising a semi-cylindrical portion, a tapered portion and a rib extending longitudinally on the outer surface of the cylindrical portion.

In witness whereof, I have hereunto signed my name.

ROBERT J. MILLIGAN.